W. A. JORDAN.
Car-Starters.

No. 144,546.

Patented Nov. 11, 1873.

WITNESSES

INVENTOR
William A. Jordan
Edson Bros
Attorneys

UNITED STATES PATENT OFFICE.

WILLIAM A. JORDAN, OF NEW ORLEANS, LOUISIANA, ASSIGNOR OF ONE-HALF HIS RIGHT TO ANDREW J. AIKEN, OF SAME PLACE.

IMPROVEMENT IN CAR-STARTERS.

Specification forming part of Letters Patent No. 144,546, dated November 11, 1873; application filed September 11, 1873.

*To all whom it may concern:*

Be it known that I, WILLIAM A. JORDAN, of New Orleans, in the parish of Orleans and State of Louisiana, have invented a new and useful Improvement in Street - Car Starters, of which the following is a full, clear, and exact description, reference being had to the accompanying drawing, in which—

Figure 1:
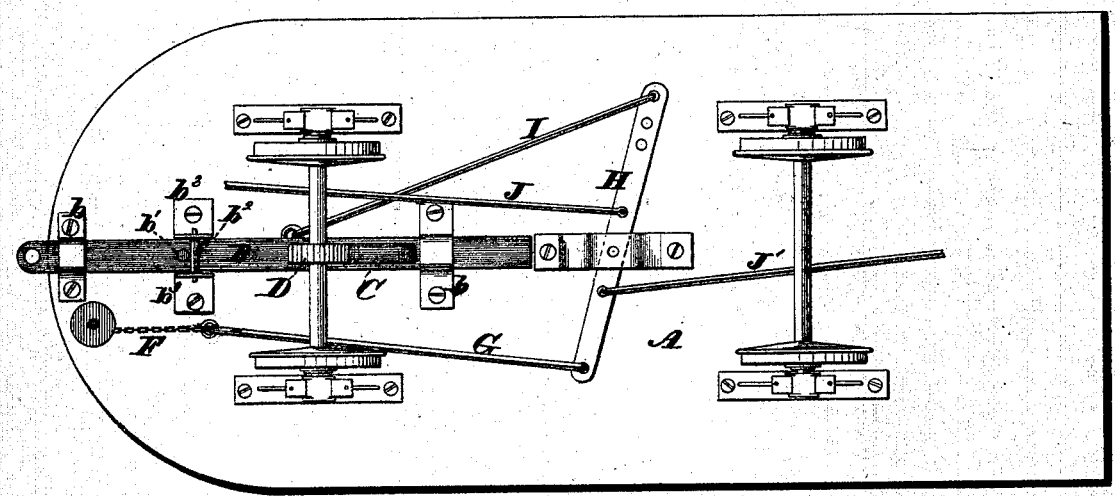
Figure 2:
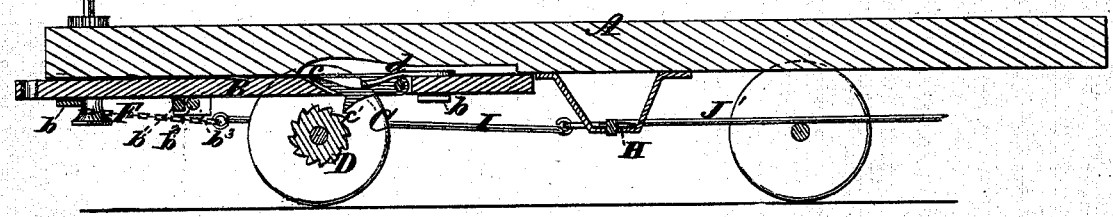

Figure 1 is a plan view of my improved car-starting mechanism attached in position to the lower side of the bottom of a car, and Fig. 2 is a longitudinal vertical section of the same.

Corresponding letters are used in the designation of like parts in the two figures.

This invention appertains to an improvement in street-car-starting mechanism; and it consists of a sliding bar having a spring-pawl engaging with a ratchet on the axle or axles of the car-wheels, and to which bar rearward movement may be imparted through the mechanism used in applying the brakes, substantially as will be hereinafter described.

To enable others to make and use my invention, I will proceed to describe it.

In the annexed drawing, A refers to the bottom of a car, which is mounted upon the usual springs, boxes, axles, and wheels, and to the lower side of which is adjusted, by staples $b\ b$, or other suitable means, the sliding bar B. The bar B is limited in its movement by means of a pin or lug, $b^1$, attached thereto at a point between a transverse friction-roller, $b^2$, journaled in studs or plates $b^3\ b^3$, attached by suitable means to the car-bottom A, and the forward one of the staples $b\ b$. The bar B is supplied near its rear end with a pawl, C, let into a slot therein, and pressed by a flat spring, $d$. The pawl C has an extension, $c$, beyond, and in front of, its tooth $c'$, which acts to prevent the latter from falling or leaving its place when at rest. The spring $d$ causes the pawl C to engage the ratchet when the bar B is thrown forward, and to yield upwardly to let it pass the ratchet when the bar is moved in the opposite direction. A ratchet, D, is supplied to the forward axle of the car-wheels for the pawl C of the bar B to engage with.

It will be observed that, as the bar B, to which the draft-bar or tongue of the car is attached, is drawn or pulled forward, the pawl C will engage the ratchet D, and that, in turn, rotate the front axle and wheels, which, of course, by their traction, will put the car in motion, and thus relieve the horses of a "dead" pull in starting the car.

E is an upright crank-shaft, journaled in the forward end of the car platform or floor, and may be provided at the lower or dependent end with a pulley or drum to receive, and around which is wound, a chain, F, the opposite end of which chain is connected to a rod, G. This rod, in turn, is attached to one arm of a lever, H, while the other arm thereof has attached to it another rod, I, which is connected to the sliding bar B with a loose joint. In lieu of the rod I, the office of which is to assist in imparting rearward movement to the sliding bar B, may be substituted a chain, having one end suitably attached to the rear end of the bar B, thence passed around a pulley disposed at a point in juxtaposition with the said end of the bar B, and carried forward and fastened to the crank-shaft E. This mechanism, which is that for applying the brakes, as will be hereinafter explained, is also for the purpose of throwing the sliding bar B back, so as to put its pawl in readiness to engage the ratchet D in case the tongue should fail to do it when the car is stopped. J J' refer to the brake-rods, attached to the lever H, one extending in rear of, and from one arm thereof to, the hind brake, and the other in front of, and from the other arm of the same to, the front brake.

The brakes being attached, through the rods J J', to the lever H, and the latter to the bar B, it will be observed that, when the said bar is thrown in, or toward the rear of the car, which takes place when the car is stopped, the brakes will be simultaneously applied with the said backward movement of the bar B, and vice versa when the latter is drawn forward.

From the foregoing, it will be seen that my mechanism can be applied to cars with but little change and great advantage.

I am aware of the patent of Joseph A. Cody, granted April 2, 1872, but do not claim anything described or shown therein.

Having thus described my invention, what

I claim, and desire to secure by Letters Patent, is—

The combination of the sliding bar B, provided with the pawl C having the extension c, and held to ratchet D by the spring d, the crank-shaft E, chain F, rods G I, lever H, and rods J J', substantially as shown and described.

In testimony whereof I have hereunto signed my name this 6th day of September, 1873, in the presence of two subscribing witnesses.

WILLIAM A. JORDAN.

Witnesses:
W. HASTOTT,
HARRIS MURPHY.